Aug. 12, 1924.    1,504,959
E. LESCHBRANDT
PHOTOGRAPHIC CAMERA
Filed June 10, 1919
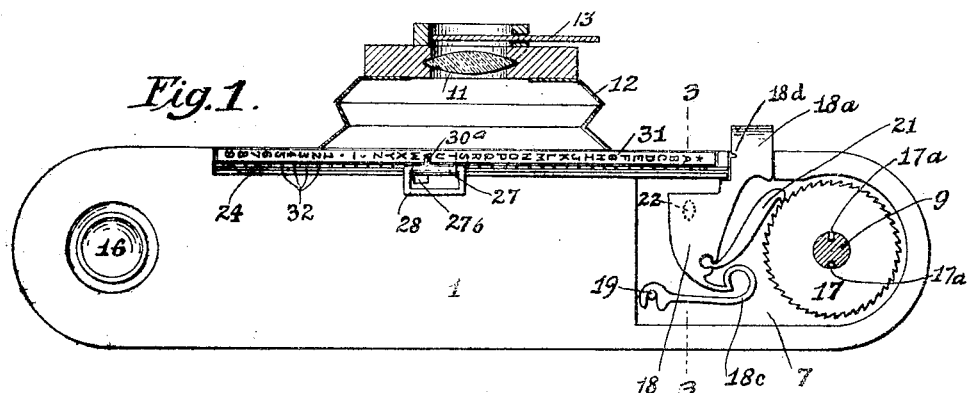
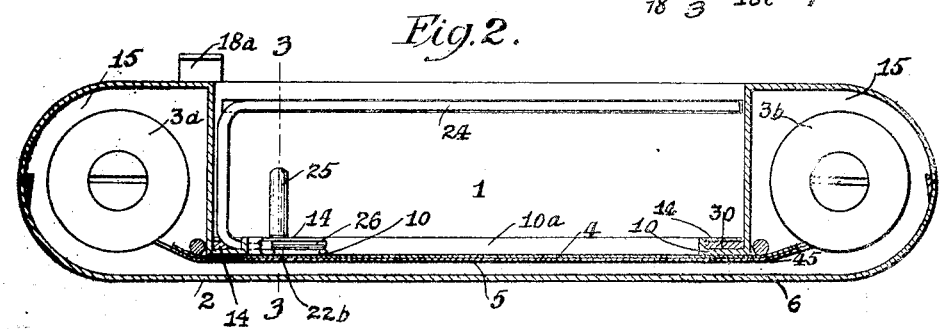
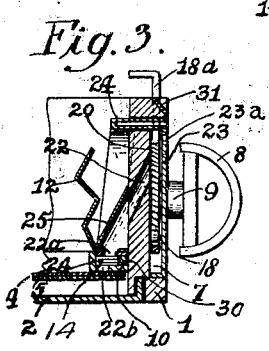
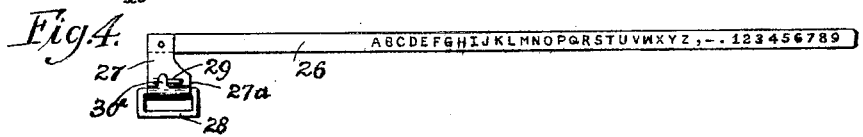
INVENTOR:
Einar Leschbrandt Patented Aug. 12, 1924.

1,504,959

UNITED STATES PATENT OFFICE.

EINAR LESCHBRANDT, OF PHILADELPHIA, PENNSYLVANIA, ASSIGNOR TO EASTMAN KODAK COMPANY, OF ROCHESTER, NEW YORK, A CORPORATION OF NEW YORK.

PHOTOGRAPHIC CAMERA.

Application filed June 10, 1919. Serial No. 303,133.

*To all whom it may concern:*

Be it known that I, EINAR LESCHBRANDT, of Philadelphia, county of Philadelphia, State of Pennsylvania, have invented certain new and useful Improvements in Photographic Cameras; and I do hereby declare the following to be a full, clear, and exact description of the same, reference being had to the accompanying drawings, forming a part of this specification, and to the reference numerals marked thereon.

My invention relates to improvements in cameras or holders for photographic material, and has for its object to furnish means permitting an operator to apply indicia or inscriptions upon the contained film or other impressible sheet, the camera herein shown and described being especially an improvement upon such cameras as are shown in my Letters Patent of the United States No. 1,278,692 and No. 1,284,379, dated respectively September 10, 1918 and November 12, 1918.

My invention is illustrated in the accompanying drawings in which similar numerals of reference indicate similar parts throughout the several views, in which:

Figure 1 is a front elevation of the side of the camera with parts in section and parts broken away;

Figure 2 is a longitudinal section through the camera casing and shows the film spools.

Figure 3 is a fragmentary transverse section of the camera being a sectional view on the line 3—3 of Figures 1 and 2, also showing the shaft 9 with handle 8 and plate 23;

Figure 4 is a character-carrying band with attached handle.

By reference to Figures 1 and 2, the camera is shown to be of the film-roll type having opposite film-chambers 15—15, film-winding spools $3^a$ and $3^b$, the former being the take-up spool, and the usual pivot studs upon which these turn, whereof one is indicated by reference numeral 16. The camera has also the turn-shaft 9 with handle 8, being the usual winding-key for moving the film over the exposure frame 10, so as to place it in successive positions opposite the lens 11 and shutter 13. Lens and shutter may be of any usual kind and have the bellows 12 attached to their housing, the wider end of the bellows being attached to the usual bellows frame 14 surrounding the exposure opening.

In the camera side, in the recess 7, at the right-hand end of Figure 1 lie three members which work together to form a combined shutter-action and step-by-step film movement, of which the following is a description: 17 is a ratchet wheel having lips fitting into grooves in the usual winding key 9, these lips $17^a$ holding the wheel and shaft together for rotation but permitting the latter to slide in and out in the usual manner; 18 is a shutter which covers when in the upper position, the exposure passage 22 and has a spring portion $18^c$ the free end of which springs against the pin 19 to keep the shutter in the upper position; and 21 is a pawl having its lower end loosely held by the shutter, as shown, so its upper or toothed end can swing back and forth against the ratchet teeth, resting thereagainst by gravity, and rotate the wheel over an arc equal to one tooth when the shutter 18 is depressed by finger action upon its "push-button" portion $18^a$. Ordinary pawl and ratchet movements are provided with a spring pressing the pawl against the ratchet teeth, but I prefer to dispense with the spring to ensure silent movement.

In the camera side 1, adjacent and parallel with its upper edge, there is inserted in a slot extending through this side the metal sheath 24 which normally contains a character carrying band 26, Figure 4. The sectional form of the sheath is seen in Figure 3. the character band 26 not being shown in this figure, and shows that it has a U shape, the open end turning outward. The sheath has a continuation of a narrower width, same beginning at the upper bend at the left in Figure 2, extending then downward, and making a second bend so as to lie with its lower end upon the upper surface of the exposure frame 10, this end being in fact inserted between said frame and the bellows frame 14. Figure 2 shows this as a piece has been broken off the inner upstanding edge $10^a$ of the exposure frame 10 in order to give this view, and also shows that the sheath 24 ends just before it reaches the exposing apertures $22^b$ in frame 10, the sheath itself having no exposing aperture. The exposure frame 10 is the usual one defining shadowgraphically the picture boundary upon the film. The frames 10 and 14 are kept a little apart in order that the character-band 26 may slide between, and this is accomplished by a pasteboard frame 30 which also closes off against light along the outer margin of the frames, to preserve a light proof condition. The aperture 22$^b$ is in line with the oblique light-passage 22, so is also the aperture 22$^a$ which extends through the bellows frame 14. As they all act together, they may be regarded as one general exposure aperture or light passage. The hood 25 fits snugly over the aperture 22$^a$ so as to keep light out except that which may pass down through the passage 22. The character band 26 being placed in the sheath, one may slide same forth and back by means of its attached handle 28 from the outside of the camera, and its characters, a single one each time, may thereby be brought into line of exposure on to the film by light passing down the passage 22 when the shutter 18 is depressed. For this purpose the characters are either transparent on opaque ground or vice versa, and the aperture 22$^b$ is, of course, only of the size whereby a single letter only will be in register at one time. When the "push button" is pressed the film also moves a step slightly longer than the width of characters on the band, to get the proper spacing, and by successive operations one may selectively print letters so as to form words below the horizontal view, upon the film margin, or one may print identifying characters or dates. The co-operation between the shutter and the light passage is so devised that light comes on as the moving shutter is nearing its lower stop, and this, in connection with the fact that the downward movement of the shutter will normally be rapid, and the aperture 23$^a$ is quite small, prevents blurring of the letters in printing.

Figure 4 shows the character band 26 attached to a slide-piece 27 having a folding handle 28 and detent spring 29. When the band is slid into the sheath 24 from the outside of the camera, the piece 27 will slide along the straight U-shaped portion of the sheath, the spring detent 29 cooperating with the notches 32, there being one notch for each letter or character on the guide scale 31, the spring and notches acting together in the usual manner of a detent for the accurate adjustment each time of a letter opposite the aperture 22$^b$. The pointer 30$^a$ will indicate corresponding characters on the guide scale, the whole device forming a particularly convenient letter exposing and selecting apparatus.

When the handle 28 is slid up to the push button, the edge 27$^a$ will enter a notch 18$^d$ in the depressed push button, thus acting as a latch to hold it down when the device is not in operation. In this position the lip 27$^b$ on the slide-piece will close off the aperture 23$^a$ permanently, the band 26 also helping thereto if it is opaque along that part which is between the handle and the letter "A". When the pointer is made to indicate the star on the guide scale 31, this portion is opposite the exposure passage, so that no letter will be printed when the push button is depressed and released, but the film will be moved forward a step, and thereby the space between words is obtained.

In my Patent No. 1,248,379, above referred to, I have shown an auxiliary shutter situated at the outer orifice of the light passage for photographing a letter of the character carrying element, and which may by adjustment be utilized to reduce the size of the light passage in order to regulate the amount of light admission, if desired. Such auxiliary shutter is therefore not shown in the present drawings, as when the aperture 23$^a$ is of proper size it is not necessary, however the present camera is constructed to permit the use of a similar one, as one may elect.

A camera constructed as herein described and shown should be held so that the operator's left hand grasps the rounded end near the push-button, the thumb resting on the latter to work it conveniently, while the right hand is free to adjust the letters, when it is held thus, about horizontally, the sky-light will enter to print the letter each time the thumb presses the push button.

In Figure 3 it is shown that the guide scale 31 stands at an angle, this being preferable as it permits a ready sight of the characters when the camera is held in the manner most convenient for operation and exposure.

I claim:—

1. A film-roll camera having in one of its sides an exposing passage to permit light to enter to the film, a shutter movably mounted opposite said passage, a tape provided with characters, a guide member in which said tape is movable across the passage to permit different characters to be projected upon the film, and means for moving the film with a step-by-step movement relatively to said passage.

2. A photographic camera having an exposure frame adapted and arranged to shadowgraphically define the pictorial view on the film, said frame being provided with an exposing aperture, a character-bearing element movably mounted opposite said aperture, a guide scale of characters arranged for sight, a guide for said element, a handle connected to said element for moving the same, a pointer movable with said element and arranged to indicate on the guide scale which character is opposite said aperture, a detent device for retaining the element in adjusted position and cooperating devices for moving and exposing the film.

3. A photographic camera having film chambers at opposite ends and therebetween an opening to admit light for view exposure and having an exposing passage leading from the exterior of one side of the camera to the film, a shutter for said passage, a sheath along said camera side, a character-carrying light pervious tape inserted in said sheath in the path of the rays of light entering said exposing passage, means for adjusting said tape for the purpose set forth, a rotatable device whereby a film-spool may be rotatably held within the camera, a ratchet-wheel rotatably connected therewith, and a movably mounted element accessible from the exterior of the camera for actuating said ratchet-wheel and the shutter.

4. The combination with a photographic camera embodying an exposure opening and provided with a small light passage adapted to register with the margin of a film placed against the opening, of a shutter controlling the light passage, a push button on the exterior of the camera for operating the shutter, and a latch for locking the push button in depressed position.

5. The combination with a film roll camera having a rotatable element arranged to engage the film roll for rotation within the camera, and having a light-passage near the longitudinal side of the camera, said passage being arranged to admit light to one of the longitudinal edges of the film, of a light pervious member bearing the alphabet in characters adapted to be photographed on the film, said member being mounted for movement opposite said passage, a shutter arranged to control the admission of light through the passage to the film, means for actuating the shutter and a movably mounted member accessible from the exterior of the camera, adapted and arranged to rotatably move said element a definite step of rotation.

6. A photographic camera having film-chambers at opposite ends, an exposure-frame 10 and a bellows frame 14, a sheath arranged along one side of the camera, one end of said sheath entering between said frames, a tape slidably mounted in said sheath and provided with the alphabet in characters adapted to be light-printed on the film, an exposing passage arranged to admit light to a character on said tape, a shutter for the passage, and a rotatably mounted roller for advancing the film relatively to said passage.

7. The combination with a photographic camera having an aperture to admit light to the film, of a shutter-device including a push-button on the camera casing, arranged to control the admission of light to the film through said aperture, an element having characters adapted and arranged to be printed on the film by admission of light through the aperture, means for feeding the film, a catch arranged to lock the push-button down flush with the exterior of the camera-casing and means for protecting the film when the push button is locked.

8. The combination with a photographic camera having a device to print characters on to a contained impressible sheet, and means for moving said sheet within the camera, said means comprising a push-button on the camera-casing, arranged to actuate said sheet-moving means upon pressure, and a catch arranged to lock said push-button down flush with the exterior of the camera-casing when desired.

9. In a folding camera, the combination with a body having a bellows chamber provided with an opening through a side wall of the body and with a light passage leading inwardly and rearwardly from said opening, of a frame forming an exposure opening at the rear of the bellows and chamber and provided in one of its sides with an opening at the rear end of the light passage and registering with the otherwise masked margin of a film when in rear of the frame and exposure opening, means for moving the film, a stencil pattern movable across the light opening and a shutter for the latter.

10. In a photographic camera, the combination with a camera body having a light opening, of an exposure identification mechanism connected with the body to receive light through said opening and embodying a movable stencil traversing the latter, a support for a movable light sensitive body, a shutter for the light opening and means for locking the shutter with the stencil in a predetermined position.

11. In a photographic camera, the combination with a camera body having a light opening, of an exposure identification mechanism connected with the body to receive light through said opening and embodying a movable stencil traversing the latter, a support for a movable light sensitive body, a reciprocating shutter for the light opening having a detent shoulder connected therewith and means adapted to lock into the detent shoulder when the stencil is in a predetermined position.

12. In a photographic camera, the combination with a camera body having a light opening and a film chamber provided with a winding mechanism, of an actinic exposure identification mechanism connected with the body to receive light through said opening and embodying a stencil arranged to traverse the same, means for actuating the winding mechanism with a step by step movement, means controlling the admission of light through said light opening and a lock for said means controlled by the position of the stencil.

13. In a photographic camera, the combination with a camera body having a light opening and a film chamber provided with a winding mechanism, of an actinic exposure identification mechanism connected with the body to receive light through said opening and embodying a stencil arranged to traverse the same, a shutter for the light opening adapted to also actuate the winding mechanism with a step-by-step movement and a lock for the shutter controlled by the position of the stencil.

14. In a photographic camera, the combination with a camera body having a light opening and a film chamber provided with a winding mechanism, of an actinic exposure identification mechanism connected with the body to receive light through said opening and embodying a stencil arranged to traverse the same, a shutter for the light opening, and a push button for operating the shutter and means actuated by the movement of the button for feeding the film before light is admitted from the light opening.

15. In a photographic camera, the combination with a camera body having a light opening and a film chamber provided with a winding mechanism, of an actinic exposure identification mechanism connected with the body to receive light through said opening and embodying a stencil arranged to travers the same, a device for actuating the winding mechanism with a step-by-step motion, a shutter device and a push button for operating the shutter and the winding mechanism, the construction being such that the winding mechanism is actuated in advance of the exposure.

16. In a photographic camera, the combination with a camera body having a light opening and a film chamber provided with a winding mechanism, of an actinic exposure identification mechanism connected with the body to receive light through said opening and embodying a stencil arranged to traverse the same, a device for actuating the winding mechanism with a step-by-step motion, a shutter device, a push button for operating both of said devices normally projecting from a face of the camera, and a lock controlled by the position of the stencil for holding the button depressed.

17. In a photographic camera, the combination with a camera body having a light opening, of an actinic exposure identification mechanism connected with the body to receive light through said opening and embodying a stencil arranged to traverse the same and a reciprocating shutter for the light opening having a disengageable connection with the winding mechanism for operating the same.

18. In a photographic camera, the combination with a camera body having a light opening, of an actinic exposure identification mechanism connected with the body to receive light through said opening and embodying a stencil arranged to traverse the same, a reciprocating shutter for the light opening having a disengageable connection with the winding mechanism and a lock for the shutter controlled by the position of the stencil.

Signed at the city of Philadelphia, county of Philadelphia and State of Pennsylvania, this 7th day of June, 1919.

EINAR LESCHBRANDT.

Witnesses:
ARNOLD KATZ,
A. S. BERKOVITZ.